United States Patent [19]
Baucheron

[11] 3,776,494
[45] Dec. 4, 1973

[54] ANTIVIBRATION SUPPORT FOR VIEWING GEAR

[75] Inventor: Alphonse Baucheron, Charenton, France

[73] Assignee: Tele-Pictures Establishment, Vaduz, Liechtenstein

[22] Filed: Apr. 10, 1972

[21] Appl. No.: 242,463

[30] Foreign Application Priority Data
Apr. 14, 1971 France ............................. 7113201

[52] U.S. Cl. ...................... 248/18, 95/86, 248/123, 248/280, 248/325
[51] Int. Cl. ............................................. F16m 11/12
[58] Field of Search ................. 248/15, 17, 18, 324, 248/325, 280, 292, 278, 123, 124; 95/86

[56] References Cited
UNITED STATES PATENTS

| | | | |
|---|---|---|---|
| 2,756,015 | 7/1956 | Larisch | 95/86 X |
| 3,044,346 | 7/1962 | Fieux | 95/86 X |
| 3,103,257 | 9/1963 | Richards | 95/86 X |
| 3,352,521 | 11/1967 | Tyler | 248/280 X |
| 3,467,350 | 9/1969 | Tyler | 248/325 X |

Primary Examiner—J. Franklin Foss
Attorney—Roberts B. Larson et al.

[57] ABSTRACT

The support is for viewing gear used aboard a vehicle and comprises means enabling its anchoring at a point situated above the head of the operator of the viewing gear, and an arm balanced by counterweights and bearing the viewing gear. The arm is mounted to pivot around an axis, parallel to the optical axis of the viewing gear and borne by a bow-shaped element. The support has between the upper anchoring means and the bow-shaped element a cardan joint enabling angular variations of the pivot about the latter. The pivot bears a rotary element on which are hinged, by one of their ends, around horizontal axes, two arms situated in a same vertical plane and between which a helicoidal spring is arranged. The arms bear at their free end around horizontal axes parallel to the preceding ones respectively the upper end of two vertical bars, on the other end of which are pivoted the ends of the bow element around horizontal axes situated in extension of one another and at right angles to the pivoting axes of the upper ends of the bars, the upper and lower pivots of each of the two bars being such that they enable angular variations.

12 Claims, 6 Drawing Figures

PATENTED DEC 4 1973

3,776,494

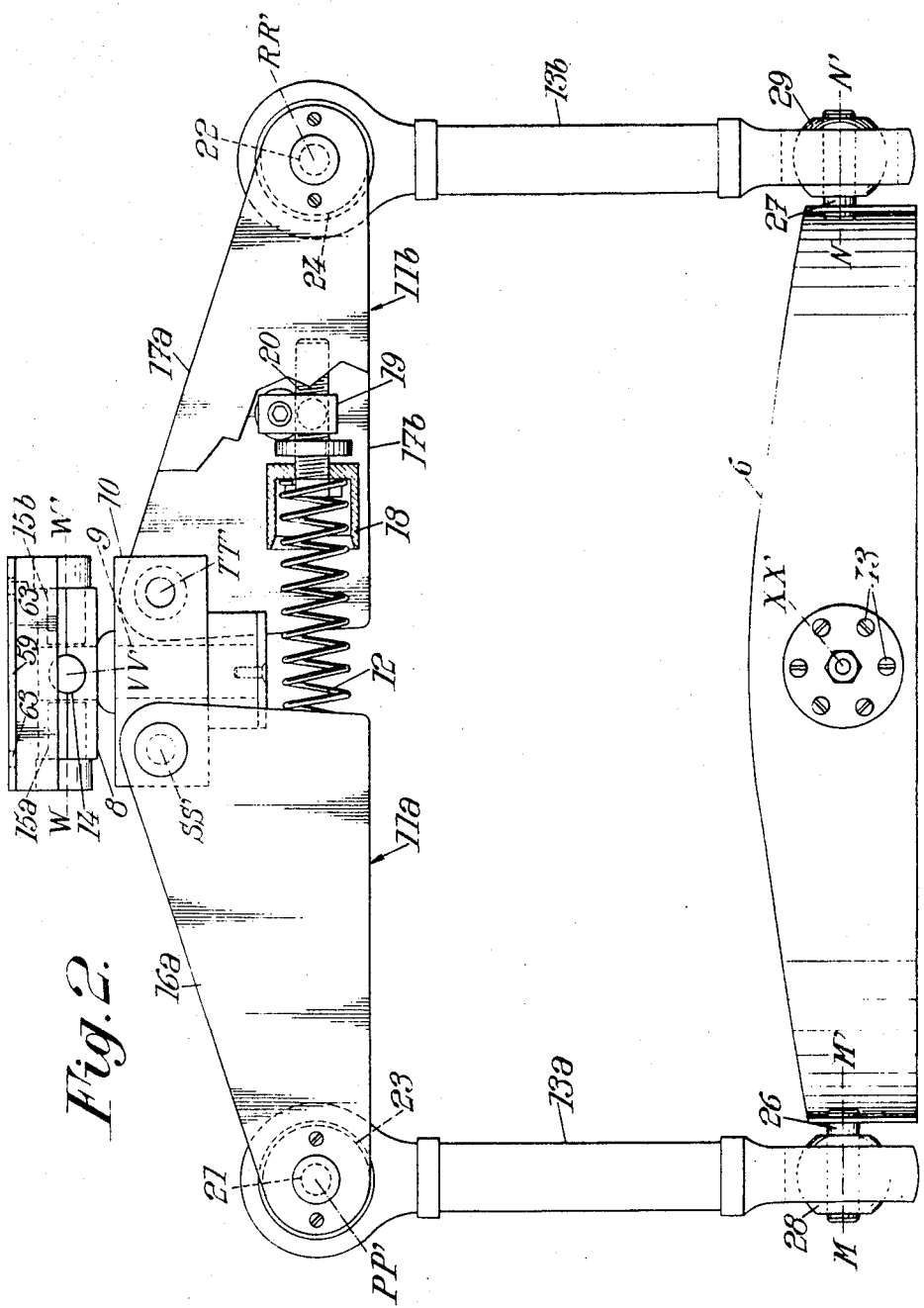

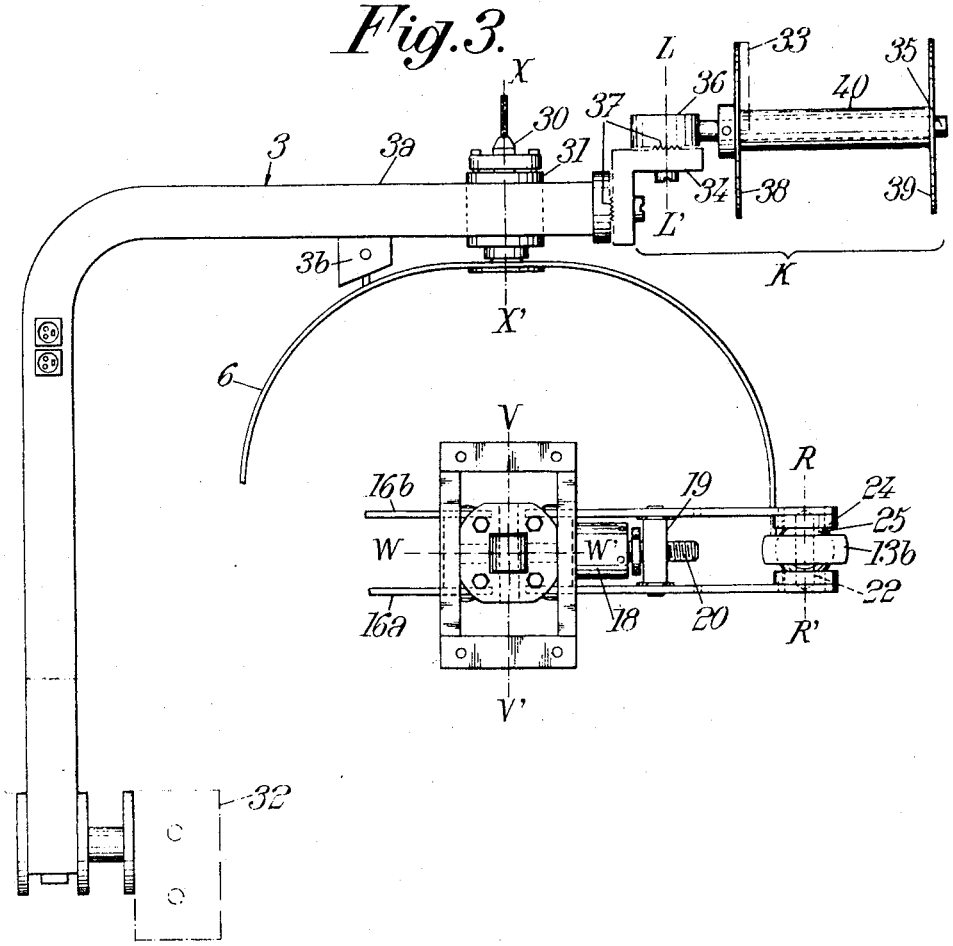

ANTIVIBRATION SUPPORT FOR VIEWING GEAR

The invention relates to an anti-vibration support for viewing gear, especially for motion picture cameras, the support being related to those which are used on board vehicles, especially helicopters, which are the site of considerable vibration.

It is known that the transmission of these disturbing vibrations to the viewing gear must be prevented; in fact, in the case where this viewing gear is constituted by a motion picture camera, these vibrations, if they were not absorbed, would entirely destroy the quantity of quality pictures obtained.

The viewing gear for support by the above said anti-vibration support can also be constituted by a device for the transmission and/or recording of images and other electronic signals, for infrared and thermographic applications, for survey missions, civil as well as military, for geological photogrammetry, for petroleum prospecting (on terra firma and at sea), for tracking and guiding missiles, for searching and rescue operations, for the control of forest fires and the like, for traffic survey, for the inspection of high voltage lines and for all optical means for the transmission and/or recording of information.

Supports of the type concerned are suspended at a point which is situated above the head of the operator of the viewing gear and comprising an arm, in proximity to one of the ends of which the viewing gear is mounted, the other end bearing balancing counterweights. This arm is mounted pivotally around an axis which is parallel to the optical axis of the viewing gear and which is borne by an element in the form of a bow, arranged horizontally in normal position, itself articulated by its two ends around a horizontal axis.

It is a particular object of the invention to provide a support of the type concerned which responds to the various desiderata of practice better than those supports existing hitherto.

The support according to the invention is characterised by the fact that it comprises, between the upper anchoring means and the bow on which the arm bearing the viewing gear is mounted, means enabling angular variations, preferably a cardan joint device, supporting a pivot with a vertical axis which bears a rotary element, for example a casing on which are articulated, through one of their ends, around horizontal axes, two arms situated in a same vertical plane and between which are arranged elastic means with a horizontal action, the said arms bearing at their free end around horizontal axes parallel to the preceding ones respectively the upper end of two vertical bars, on the other end of which are articulated the ends of the above said bow around horizontal axes situated in extension of one another and at right angles of articulation of the upper ends of the bars, the upper and lower articulations of each of the two bars being such that they enable angular variations.

The invention relates, apart from the above said features, to other features which are preferably used at the same time and which will be more explicitly considered below.

In order that the invention may be more fully understood, one embodiment of an antivibration support for viewing gear according to the invention is described below purely by way of illustrative but non-limiting example, with reference to the accompanying drawings, in which:

FIG. 2 shows in elevation on a larger scale, with portions removed, the essential constituent elements of the support of FIG. 1:

FIG. 3 shows on a different scale, in plan view, with portions removed, the essential constituent elements of the above said support:

Figure 1:
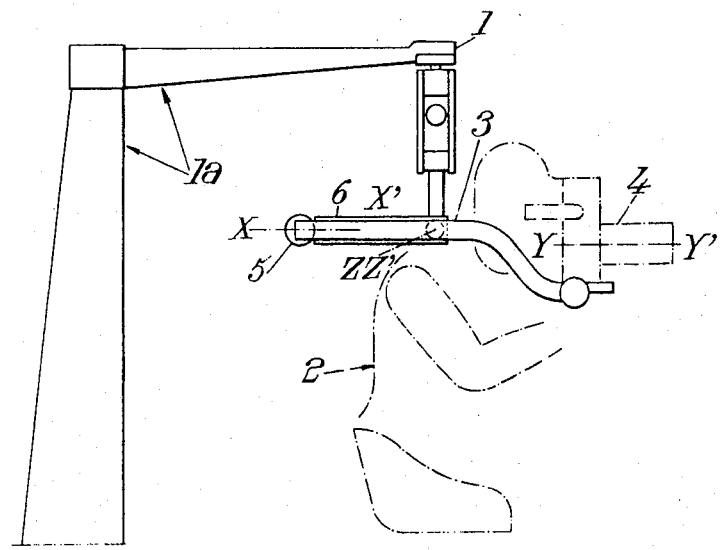
FIG. 1 is a diagramatic view in elevation showing the general arrangement of one embodiment of a support according to the invention.
Figure 6:
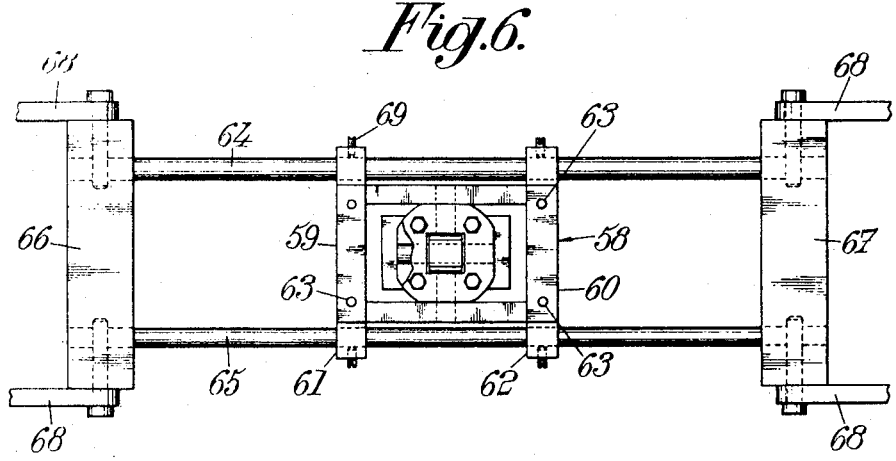

FIG. 6 lastly is a plan view, with portions removed, of a constituent part of the support of FIG. 1.

According to the invention and, more especially, according to those of its types of application, as well as according to those embodiments of its various parts, to which it would appear that preference should be given, in order to construct a support of the type concerned for viewing gear —it will be assumed below that the viewing gear is constitued by a motion picture camera operating on board a helicopter—, procedure is as follows or in similar manner.

First of all as far as this support as a whole is concerned, and apart from the improvements according to the invention to be incorporated therein, it is fixed by anchoring means 1, for example a jib 1a as seen in FIG. 1, at a point which is situated always above the head of the operator, shown diagramatically at 2, and comprises an arm 3, in proximity to one of the ends of which is mounted a motion picture camera 4, the other end bearing counterweights 5, the said arm being fixed pivotally around a pivot not shown with an axis X—X' parallel to the optical axis Y—Y' of the camera, said pivot being borne by an element 6 in the form of a bow, arranged horizontally in normal position and articulated itself through its two ends around a horizontal axis Z—Z'.

This being the case, the support according to the invention comprises a cardan joint device —or other means enabling angular variations responding to changes in the situation of the vehicle— denoted as a whole by 8 and supporting a pivot 9, of vertical axis, which bears a rotary casing 10 on which are articulated through one of their ends, around horizontal axes S—S' and T—T', two arms, denoted in their assembly by 11a and 11b, which are situated in a same vertical plane and between which are arranged elastic means with a horizontal action, for example a helicoidal spring 12. The arms 11a and 11b bear at their free end, around horizontal axes P—P' and R—R' parallel to the axes S—S' and T—T', respectively the upper end of two vertical bars 13a and 13b, on the other end of which are articulated respectively the ends of the bow 6 around two horizontal axes M—M' and N—N' which are merged with the above said axis Z—Z' and which are at right angles to the horizontal axes P—P' R—R' and S— S' T—T'.

The cardan joint 8 permits angular variation of the pivot 9 around a first horizontal axis V—V' formed by a pin 14 parallel to the above said axes P—P' R—R' S—S' T—T', and around a second horizontal axis W—W' at right angles to the preceding one and formed by two pins 15a and 15b.

In the case of light apparatus, the cardan joint could be replaced by a device of the type of those known under the name "Silent Block," in the form of a cup. "Silent Block" is a well known coupling of parts for example two concentric tubes, bonded flexibly together by rubber and marketed in France.

As seen in FIGS. 2 and 3, each of the arms 11a and 11b is formed by two parallel brackets 16a and 16b as regards the arm 11a and 17a and 17b as regards the arm 11b.

For the positioning of the spring 12, there is provided respectively between the constituent brackets of the arms 11a and 11b a cup, inside of which is housed one of the ends of the spring (in FIGS. 2 and 3, there has been shown the cup 18 corresponding to the arm 11b, the cup arranged between the brackets of the arm 11a not being shown).

As seen in FIGS. 2 and 3, the cup 18 is fixed on the constituent brackets of the corresponding arm 11b by means denoted as a whole by 19.

In the embodiment shown in the Figures, the cup 18 is fixed on the means 19 by a screw mounting 20 cooperating with the means 19 and enabling for this reason the adjustment of the position of the cup 18 with respect to the means 19 and thus regulation of the tension of the spring 12.

The axes P—P' and R—R', around which is articulated the respective upper end of the vertical arm 13a and 13b are formed by pins 21 and 22 of which the ends are supported by rings 23 and 24 fixed on the corresponding constituent brackets of the arms 11a and 11b and the pins 21 and 22 bear articulation elements in the form of ball joints (25 in the case of the pin 22, see FIG. 3) on which are mounted the upper ends of the arms 13a and 13b, which, for this reason, can undergo an angular variation around their longitudinal axis and describe a conical movement over 360°. Like the cardan joint, these ball joints could be replaced by devices of the type known under the name "Silent Block," in the form of a cup.

The axes M—M' and N—N' are formed by pins 26 and 27 which bear articulation elements in the form of ball joints 28 and 29, of similar constitution to the elements of the above-indicated type 25, on which are pivoted the lower ends of the vertical arms 13a and 13b, and which enable, just as the elements 25, angular variations around the longitudinal axis of the said arms 13a and 13b.

As seen in FIG. 3, the abovesaid axis X—X' is formed by a part 30 fixed on the bow 3 and around which a rotary element can turn on which is fixed the arm 3 and which forms part of a casing 31.

Again as seen in FIG. 3, the arm 3 comprises at one of its ends a mounting plate 32 intended to receive the motion picture camera (this plate is arranged so that it enables the placing of the camera in a position enabling the vertical taking of pictures) and at the other of its ends an assembly of part K, which will be more explicitly considered below, and on which are fixed the counterweights 33.

The assembly of parts K comprises an element 34 in the form of an angle bracket, of which one of the wings is fixed to the corresponding end of the arm 3, and on the other of which is fixed pivotally a rod 35, by means 36, around an axis L—L' perpendicular to the said wing.

As seen in FIG. 3, there is provided between the end of the arm 3 and the corresponding wing of the element 34, as well as between the other wing of this element and the fixing means 36 ensuring the mounting of the rod 35 on this wing, means 37 enabling the blocking, of on one hand the element 34 in any position around an axis perpendicular to the wing by which it is fixed on the arm 3 (and formed by the branch 3a of the arm 3), and on the other hand means 36 in any position around the axis L—L', which enables modification of the effect of the counterweights 33 by giving the rod 35 different positions around the two axes concerned.

The counterweights 33 are selected preferably in the shape of half discs, as seen in FIG. 3, which are immobilised by locking means not shown between two brackets 38 and 39 borne by a bush 40 which is keyed on the rod 35. Due to their half disc shape, the longitudinal and vertical effect of the counterweights 33 can be modified, by varying their position around the rod 35. To lock the arm 3 with respect to the bow 6, a locking bolt 36 may be provided.

The casing 31, which bears the arm 3 pivotally around the part 30, can be withdrawn very easily from the part 30 and thus enables the rapid unfastening of the arm 3 and of the bow 6. The constitution of the assembly constituted by the casing 31 and the part 30 is apparent in a more precise manner from FIGS. 4 and 5.

As regards firstly the part 30, it is composed of two elements, of which one is in the shape of a tube 41 which comprises a flange 42 which is fixed on the bow 6 by means of screws 43, and of which the other is constituted by a rod 44 which can slide inside the tube 41 against the effect of a spring 45. It is the part 30 which bears the casing 31, which comprises, on one hand two parts 46a 46b fast to one another and mounted frictionally on the tube 41, on the other hand a cage 47 rotatable with respect to the parts 46a and 46b by means of the interposition of ball bearings 48, and lastly a mechanism, which will be described in more detail below, and which enables the locking of the fixed parts 46a and 46b bearing the cage 47 with respect to the part 30.

Figure 4:
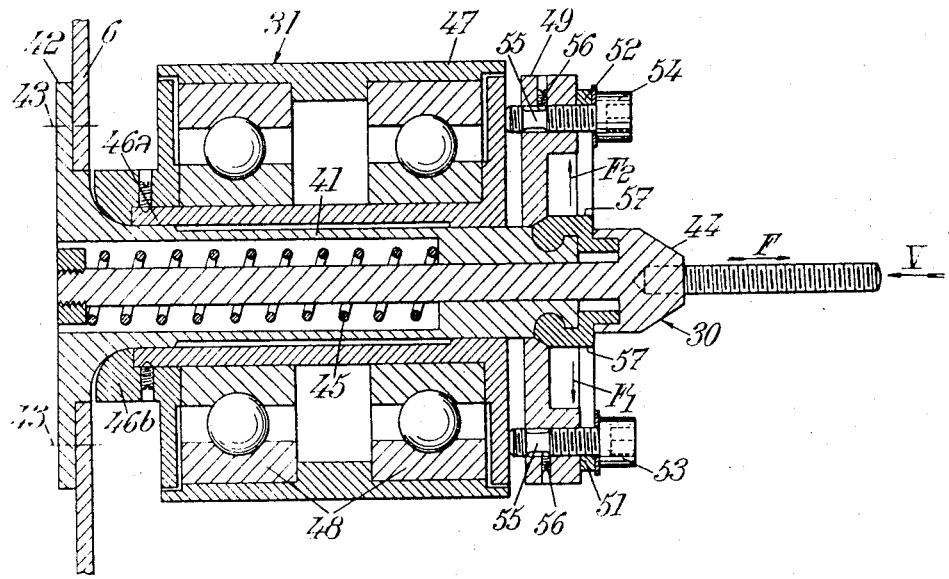
FIG. 4 shows in section, on a larger scale, a portion of the support shown in FIG. 3.
Figure 5:
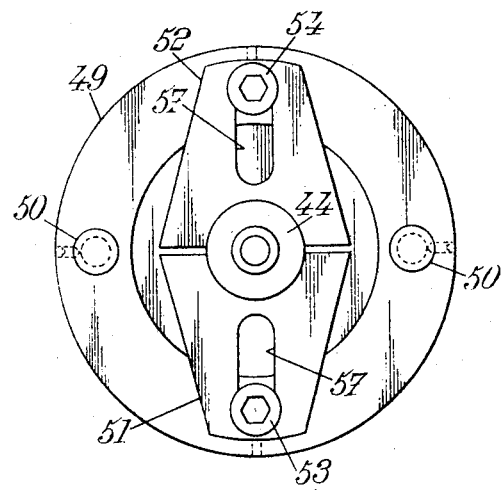
FIG. 5 is an elevation along the line V—V, of FIG. 4.

This locking mechanism comprises an annular plate 49 fixed to remain on the part 46a by means of captive pins 50. Two locking elements 51 and 52 are held against the plate 49 by means of screws 53, 54 captive in the plate 49 but able to occupy with respect to the latter two end positions defined by a cut out comprised by the screws and cooperating with the grub screws 56. The elements 51 and 52 comprise slots 57 elongated in the direction of the part 30 and due to which the elements 51 and 52 can occupy with respect to the screws 53 and 54, when they are unscrewed, two positions. In the latter of these positions, namely that which is shown in FIGS. 4 and 5, the elements 51 and 52, due to their configuration which is evident from FIG. 4, can cooperate with the tube 41 and the rod 44 to lock the plate 49 and, consequently, the fixed parts 46a and 46b with respect to the part 30. In the second of these positions, which is reached after the screws 53 and 54 have been unscrewed and the rod 44 has been moved in the direction of the arrow F against the effect of the spring 45 by a sufficient distance to disengage the elements 51 and 52 which are themselves moved respectively in the direction of the arrow $F_1$ and $F_2$, it is possible to withdraw the assembly from the casing 31 of the part 30.

It will be clear that the operations of locking and unlocking the casing 31 with respect to the part 30 are effected in a very simple manner by acting on two screws and by pulling on a rod, which enables the rapid mounting and dismounting of the arm 3.

The means for anchoring the support thus constituted at a point situated above the head of the operator are preferably constructed as indicated in FIG. 6, so as to enable movements of the assembly of the support parallel to the optical axis of the camera, when the latter is pointed in the direction of advance of the vehicle.

These anchoring means comprise a bow generally denoted by 58 in which is housed the abovesaid cardan articulation, this bow comprising two wings 59 and 60 through which it can be anchored on support elements 61 and 62.

The anchoring may be effected by means of pin 63 borne by the element 61 and 62 and cooperating with corresponding holes formed in the said wings.

To enable the abovesaid displacements, the supports 61 and 62 are mounted on two parallel rods 64 65 which can, either be provided at the end of a jib such as 1a (FIG. 1), or (as seen in FIG. 6) be fixed on a support comprising two cross members 66 and 67 which are held against the ceiling of the vehicle in which the support is arranged by means of rod 68, constructed for example in the form of a bow. The latter mounting is preferred, especially in the case where the height under the ceiling of the vehicle is slight.

To immobilise bow 58 and, consequently, the support in a given position with respect to the cross members 66 and 67, means are provided enabling the locking of the elements 61 and 62 on the rod 64 and 65, these means being formable by locking screws 69.

The support thus constituted operates as follows.

The longitudinal vibratory movements, transmitted through the support 1a or the rod 68 to the bow 58, are neutralised by the angular variations that the pivot 9 can effect around the axes V—V' and W—W'.

These angular variations also enable the apparatus to be adapted to changes in the attitude of the helicopter.

The vertical vibratory movements are neutralised by the alternate compressions and relaxations of the spring 12 and hence are not transmitted to the camera.

Of course the characteristics, as well as the desgree of compression of the spring 12, are selected as a function of the weight of the assembly constituted by the camera and the counterweights borne by the arm 3.

The residual horizontal vibrations, lastly, are absorbed along this plane and over 360° by the angular variations rendered possible by the ball joint bars 13a and 13b.

It will be seen that at each articulation level a fraction of the vibratory spectrum is entirely eliminated, leaving finally the masses of the camera and of the counterweights perfectly inert.

As has been indicated above, the variations in the position of the support parallel to the direction of advance of the vehicle are rendered possible by means of the mounting described with respect to FIG. 6.

The changes in site of the camera are rendered possible due to the pivoting of the casing 10 around the pivot 9, and its changes in inclination due to the possibility of turning the bow 6 around the axis Z—Z'.

As a result of which, and whatever the embodiment adopted, there is thus provided a support of the type concerned of which the characteristics and the operation emerge sufficiently from the foregoing for it to be unnecessary to dwell further on this subject and which present, with respect to those previously existing, numerous advantages, especially, that of enabling the apparatus to be adapted to all changes in attitude of the vehicle, that of absorbing easily vertical movements through the horizontal spring, due to the reducing effect of the articulated arms, that of enabling the absorption of all the horizontal vibratory components over 360° due to the conical movement of the vertical bars, that of being of great anti-vibratory sensitivity for a wide spectrum of disturbances, due to the distance existing between all the articulation points and to the small weight of the structural elements.

As is self-evident, and as emerges already from the foregoing, the invention is in no way limited to those of its types of application, nor to those embodiments of its various parts, which have been more especially indicated; it encompasses, on the contrary, all modifications.

I claim:

1. Antivibration support for viewing gear for use aboard a vehicle and comprising means for anchoring said gear at a point above the head of the operator of said gear, and an arm balanced by counterweights and bearing said gear, said arm being mounted for pivoting around an axis, parallel to the optical axis of the viewing gear and borne by a bow-shaped element, said support comprising, between said anchoring means and the bow-shaped element, means supporting a pivot with a vertical axis and enabling angular variations of the pivot about the latter, said pivot bearing a rotary element on which are hinged, by one of their ends, around horizontal axes, two arms situated in a same vertical plane and between which are arranged elastic means with horizontal action, said arms bearing at their free end around horizontal axes parallel to the preceding ones respectively the upper end of two vertical bars, on the other end of which are pivoted the ends of said bow element around horizontal axes situated in extension of one another and at right angles to the pivoting axes of said upper ends of the bars, the upper and lower pivots of each of the two bars being such that they enable angular variations.

2. Antivibration support for viewing gear for use on board a helicopter and comprising, means enabling its anchoring at a point situated above the head of the operator of said gear, and on the other hand an arm balanced by counterweights and bearing said gear, said arm being mounted pivotally around an axis, parallel to the optical axis of said gear and borne by an element in the form of a bow, said support comprising, between the upper anchoring means and the bow means supporting a pivot of vertical axis and enabling angular oscillations of the latter, said pivot bearing a rotary element on which are articulated, through one of their ends, around horizontal axes, two arms situated in a same vertical plane and between which are arranged elastic means with horizontal action, said arms bearing at their free end around horizontal axes parallel to the preceding one respectively the upper end of two vertical bars, on the other end of which are articulated the ends of said bow around horizontal axes situated in extension of one another and at right angles to the articulation axes of the upper ends of the bars, the upper and lower articulations of each of the two bars being such that they enable angular variations.

3. Antivibration support according to claim 1, wherein the means supporting the pivot with vertical axis are constituted by a cardan joint device.

4. Antivibration support according to claim 1, wherein the elastic means with horizontal action arranged between the two arms articulated on the rotary element are constituted by helicoidal spring.

5. Antivibration support according to claim 1, wherein the upper and lower articulations of the vertical bars, arranged between the bars articulated on the rotary casing of and the bow, are of the ball-joint type.

6. Antivibration support according to claim 1, wherein the means supporting the pivot with vertical axis are constituted by a device comprised of parts bonded flexibly together by rubber.

7. Antivibration support according to claim 1, wherein the upper and lower articulations of the vertical bars comprise a device comprised of parts bonded flexibly together by rubber.

8. Antivibration support according to claim 4, wherein the helicoidal spring is held in place between the two arms articulated on the rotary casing by means of cups provided respectively on each of the two arms and inside of which are housed the respective ends of the spring, said cups comprising means of the screw type, adapted to adjust to the relative positions of the two cups with respect to one another and thus to act on the tension of the spring.

9. Antivibration support according to claim 1, wherein the arm bearing the viewing gear is mounted on the bow by a device which comprises, an element fast to the bow, and a casing capable of being keyed on the element fast to the bow by means of a locking mechanism, said casing comprising a rotary cage bearing said arm.

10. Antivibration support according to claim 9, wherein the locking mechanism is constituted by screws co-operating with a spring-urged rod.

11. Antivibration support according to claim 9, wherein said anchoring means comprise a cradle in which the cardan joint is housed, said cradle being fixed on support elements, immobilisable in a plurality of positions with respect to a support comprising two rods parallel to the ceiling and to the axis of the vehicle, said support being held against the ceiling of the vehicle by bow-shaped rods.

12. Antivibration support according to claim 1, wherein the counterweights are semicircular and borne by a rod which is connected to one of the wings of an angle member, of which the second wing is fixed to the arm which bears the viewing gear, the mounting being such that the rod bearing the counterweights can be locked with respect to the wing on which it is fixed at a plurality of positions around an axis perpendicular to this wing, the angle member being immobilisable at a plurality of positions around an axis perpendicular to the second wing.

* * * * *